(12) United States Patent
Fadell et al.

(10) Patent No.: US 8,832,557 B2
(45) Date of Patent: Sep. 9, 2014

(54) ADJUSTING MEDIA DISPLAY IN A PERSONAL DISPLAY SYSTEM BASED ON PERSPECTIVE

(75) Inventors: Anthony Fadell, Portola Valley, CA (US); John Tang, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 641 days.

(21) Appl. No.: 12/072,762

(22) Filed: Feb. 27, 2008

(65) Prior Publication Data

US 2008/0276178 A1    Nov. 6, 2008

Related U.S. Application Data

(60) Provisional application No. 60/927,624, filed on May 4, 2007, provisional application No. 61/010,126, filed on Jan. 3, 2008.

(51) Int. Cl.
*G06F 3/048* (2013.01)

(52) U.S. Cl.
USPC .......................................... 715/733; 715/747

(58) Field of Classification Search
CPC ........ G06F 1/1605; G06F 17/30; G06F 3/048
USPC ................................. 715/747, 733
See application file for complete search history.

(56) References Cited

U.S. PATENT DOCUMENTS

| | | | |
|---|---|---|---|
| 5,003,300 A | 3/1991 | Wells | |
| 5,632,742 A | 5/1997 | Frey et al. | |
| 5,673,059 A | 9/1997 | Zavracky et al. | |
| 6,046,712 A | 4/2000 | Beller et al. | |
| 6,084,555 A | 7/2000 | Mizoguchi et al. | |
| 6,101,038 A | 8/2000 | Hebert et al. | |
| 6,320,559 B1 | 11/2001 | Yasukawa et al. | |
| 6,323,846 B1 | 11/2001 | Westerman et al. | |
| 6,450,639 B1 | 9/2002 | Abraham | |

(Continued)

FOREIGN PATENT DOCUMENTS

| | | |
|---|---|---|
| DE | 10047237 A1 | 7/2002 |
| DE | 10103922 A1 | 7/2002 |

(Continued)

OTHER PUBLICATIONS

U.S. Appl. No. 12/072,763, Notice of Allowance mailed May 30, 2013, 11 pgs.

(Continued)

*Primary Examiner* — Andrea Leggett
(74) *Attorney, Agent, or Firm* — Schwegman Lundberg & Woessner, P.A.

(57) ABSTRACT

A personal display system with which a user may adjust the configuration of displayed media is provided. The personal display system may include an electronic device operative to provide media to a personal display device operative to display the received media. Using one or more optical and digital components, the personal display device may adjust displayed media to overlay features of a theater, thus giving the user of the personal display device the impression of being in the theater. In some embodiments, the personal display device may receive a user selection of a seat in the theater from which to watch the media, and may adjust the media display accordingly. In some embodiments, the personal display device may detect the user's movements using one or more sensors and may adjust the displayed image based on the user's movements.

29 Claims, 10 Drawing Sheets

(56) References Cited

U.S. PATENT DOCUMENTS

| | | |
|---|---|---|
| 6,480,174 B1 | 11/2002 | Kaufmann et al. |
| 6,611,653 B1 | 8/2003 | Kim et al. |
| 6,916,096 B2 | 7/2005 | Eberl et al. |
| 6,937,400 B2 | 8/2005 | Olsson |
| 7,245,273 B2 | 7/2007 | Eberl et al. |
| 7,530,019 B2 | 5/2009 | Kjeldsen et al. |
| 7,595,933 B2 | 9/2009 | Tang |
| 7,641,342 B2 | 1/2010 | Eberl et al. |
| 7,969,383 B2 | 6/2011 | Eberl et al. |
| 8,016,421 B2 | 9/2011 | Eberl et al. |
| 8,042,947 B1 | 10/2011 | Eberl et al. |
| 8,113,657 B2 | 2/2012 | Eberl et al. |
| 8,549,415 B2 | 10/2013 | Tang |
| 8,605,008 B1 | 12/2013 | Prest et al. |
| 2002/0082879 A1* | 6/2002 | Miller et al. ............... 705/5 |
| 2002/0101568 A1* | 8/2002 | Eberl et al. ............... 351/211 |
| 2002/0109680 A1* | 8/2002 | Orbanes et al. ............... 345/418 |
| 2002/0113755 A1 | 8/2002 | Lee |
| 2004/0224638 A1 | 11/2004 | Fadell et al. |
| 2005/0278750 A1* | 12/2005 | Grossman et al. ............... 725/62 |
| 2006/0061555 A1 | 3/2006 | Mullen |
| 2006/0119576 A1* | 6/2006 | Richardson et al. ............... 345/156 |
| 2007/0162853 A1 | 7/2007 | Weber et al. |
| 2007/0201737 A1 | 8/2007 | Cai |
| 2007/0237491 A1 | 10/2007 | Kraft |
| 2008/0088529 A1 | 4/2008 | Tang |
| 2008/0088936 A1 | 4/2008 | Tang et al. |
| 2008/0088937 A1 | 4/2008 | Tang |
| 2008/0246694 A1* | 10/2008 | Fischer ............... 345/9 |
| 2008/0249895 A1* | 10/2008 | Mariotti ............... 705/27 |
| 2008/0255889 A1* | 10/2008 | Geisler et al. ............... 705/5 |
| 2010/0331721 A1 | 12/2010 | Epley |
| 2011/0090135 A1 | 4/2011 | Tricoukes et al. |
| 2013/0234915 A1 | 9/2013 | Takeda et al. |

FOREIGN PATENT DOCUMENTS

| | | |
|---|---|---|
| WO | 0231577 A1 | 4/2002 |
| WO | 0231578 A1 | 4/2002 |
| WO | 0231580 A1 | 4/2002 |
| WO | 0233472 A2 | 4/2002 |

OTHER PUBLICATIONS

U.S. Appl. No. 12/114,499, Final Office Action mailed Apr. 22, 2013, 17 pgs.
U.S. Appl. No. 12/114,499, Notice of Allowance mailed Aug. 8, 2013, 6 pgs.
U.S. Appl. No. 12/114,499, Response filed Jun. 24, 2013 to Final Office Action mailed Apr. 22, 2013, 5 pgs.
U.S. Appl. No. 12/072,763, Final Office Action mailed Nov. 15, 2011, 9 pgs.
U.S. Appl. No. 12/072,763, Non Final Office Action mailed May 12, 2011, 7 pgs.
U.S. Appl. No. 12/072,763, Reply filed Feb. 15, 2012 to Final Office Action mailed Nov. 15, 2011, 13 pgs.
U.S. Appl. No. 12/072,763, Response filed Feb. 22, 2011 to Restriction Requirement mailed Jan. 20, 2011, 3 pgs.
U.S. Appl. No. 12/072,763, Response filed Aug. 12, 2011 to Non Final Office Action mailed May 12, 2011, 15 pgs.
U.S. Appl. No. 12/072,763, Restriction Requirement mailed Jan. 20, 2011. 6 pgs.
U.S. Appl. No. 12/114,499, Examiner Interview Summary mailed Jan. 3, 2012, 3 pgs.
U.S. Appl. No. 12/114,499, Examiner Interview Summary mailed Sep. 8, 2011, 3 pgs.
U.S. Appl. No. 12/114,499, Final Office Action mailed Oct. 11, 2011, 15 pgs.
U.S. Appl. No. 12/114,499, Non Final Office Action mailed Mar. 22, 2011, 12 pgs.
U.S. Appl. No. 12/114,499, Non Final Office Action mailed Apr. 13, 2012, 19 pgs.
U.S. Appl. No. 12/114,499, Non-Final Office Action mailed Apr. 13, 2012, 19 pgs.
U.S. Appl. No. 12/114,499, Response filed Jan. 31, 2012 to Non Final Office Action mailed Oct. 11, 2011, 17 pgs.
U.S. Appl. No. 12/114,499, Response filed Jun. 30, 2011 to Non Final Office Action mailed Mar. 22, 2011, 17 pgs.
U.S. Appl. No. 12/114,499, Response filed Oct. 12, 2012 to Non-Final Office Action mailed Apr. 13, 2012, 16 pgs.
U.S. Appl. No. 12/114,499, Supplemental Amendment filed Sep. 20, 2011, 8 pgs.
U.S. Appl. No. 14/098,980, Non Final Office Action mailed Mar. 4, 2014, 10 pgs.

* cited by examiner

ADJUSTING MEDIA DISPLAY IN A PERSONAL DISPLAY SYSTEM BASED ON PERSPECTIVE

CROSS-REFERENCE TO RELATED APPLICATIONS

This application claims priority to Prest et al., U.S. Provisional Patent Application No. 60/927,624, filed May 4, 2007, entitled "Head-Mounted Display," the entirety of which is incorporated herein by reference.

This application also claims priority to Fadell et al., U.S. Provisional Patent Application No. 61/010,126, filed Jan. 3, 2008, entitled "Adjusting Media Display in a Personal Display system," the entirety of which is incorporated herein by reference.

BACKGROUND OF THE INVENTION

This invention relates to a personal display system and more particularly to adjusting media displayed in a personal display system. Using personal display systems, users are not restrained by static displays, such as televisions or desktop computers, and may instead carry their media and view it anywhere. Because of their relative small size, which enhances portability, some personal display systems display media in the configuration in which it is provided by the media source, without any adjustments or modifications.

Other personal display systems may include a screen on which the user may view media, and which the user may zoom to adjust the display. Once zoomed, the user may select directional keys or other options to move the displayed media to access portions of the media that were hidden from view as a result of the zoom. While such systems may allow the user to move the media screen, the interface for doing so may be complex, cumbersome, and non-intuitive.

Some personal display systems may ignore user head movements, and may continue to display the same media on the media screen without any change in configuration. In some cases, the user's eyes may be fatigued from staring at the same location on the media after viewing the media for a period of time.

SUMMARY OF THE INVENTION

Using the personal display device of this invention, users may adjust the media that is displayed to cater to the user's desires. In some embodiments, the user may direct the personal display device to zoom in or out the displayed media. For example, the user may direct the personal display device to play back a video while displaying only a portion of the video (e.g., the portion of the video available for viewing after zooming).

In some embodiments, the user may further adjust the media display of the personal display device by masking parts of the media and adding an overlay on a portion of the media display. For example, the user may select a theater, stadium, performance hall, or other location for viewing performances, and direct the personal display device to overlay the outlines of the selected location on the displayed media. In some embodiments, the user may select a particular theater or location to view media as if the user were in the selected theater. To further enhance the user's belief that the user is in the selected theater with other patrons, the personal display device may display outlines of other patrons in addition to the outlines of the theater. The outlines of other patrons may be operative to move to further increase the realism of the display.

In some embodiments, the user may select a particular seat or location within the theater from which to watch the media. For example, the personal display device may display a seating map from which the user may select a particular seat. In response to receiving a selection of a seat, the personal display device may adjust the displayed media to give the user the impression that the media is viewed from the selected seat. For example, the personal display device may skew or stretch the displayed media to reflect a user's selection of a seat on the side of the theater. As another example, the personal display device may modify the display of a sporting event to reflect the seat in the stadium from which the user selected to watch the event.

In some embodiments, the personal display device may be operative to display a mosaic of a plurality of media items, for which the user may select to view a particular media item. For example, in response to a user selection of a particular media item from the mosaic, the personal display device may zoom to the selected media item, and may mask the media items other than the selected media item. The personal display device may superimpose any suitable type of overlay over the mask.

In addition to adjusting the displayed media, the personal display device may be operative to adjust other characteristics of played back media. For example, the personal display device may adjust the sound output to the user to reflect the acoustics of a selected theater, or to reflect the user's selected location within the theater. As another example, the personal display device may introduce additional noise to reflect the environment in which the user may be viewing the media (e.g., a sports stadium).

When the user directs the personal display device to adjust the displayed media such that the entirety of the media provided cannot be displayed on the display (e.g., the user zoomed in the display), the personal display device may enable an option by which the user may move his head, eyes, or another body part to cause the portion of the media displayed to follow the user's movement. The personal display device may detect and quantify the user's movement using any suitable approach, including for example by integrating one or more sensors in the personal display device. Upon receiving an indication of a user's movement from the sensors, the personal display device may determine the amount and speed of the users, movement, and direct the displayed media to move by an amount and at a speed related to those of the user's movement. In some embodiments, the correlation between the user's movement and the media display adjustments may be non-linear. In some embodiments, after detecting the user's movement, the personal display device may delay moving the displayed media. This may assist in reducing a user's eye fatigue.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
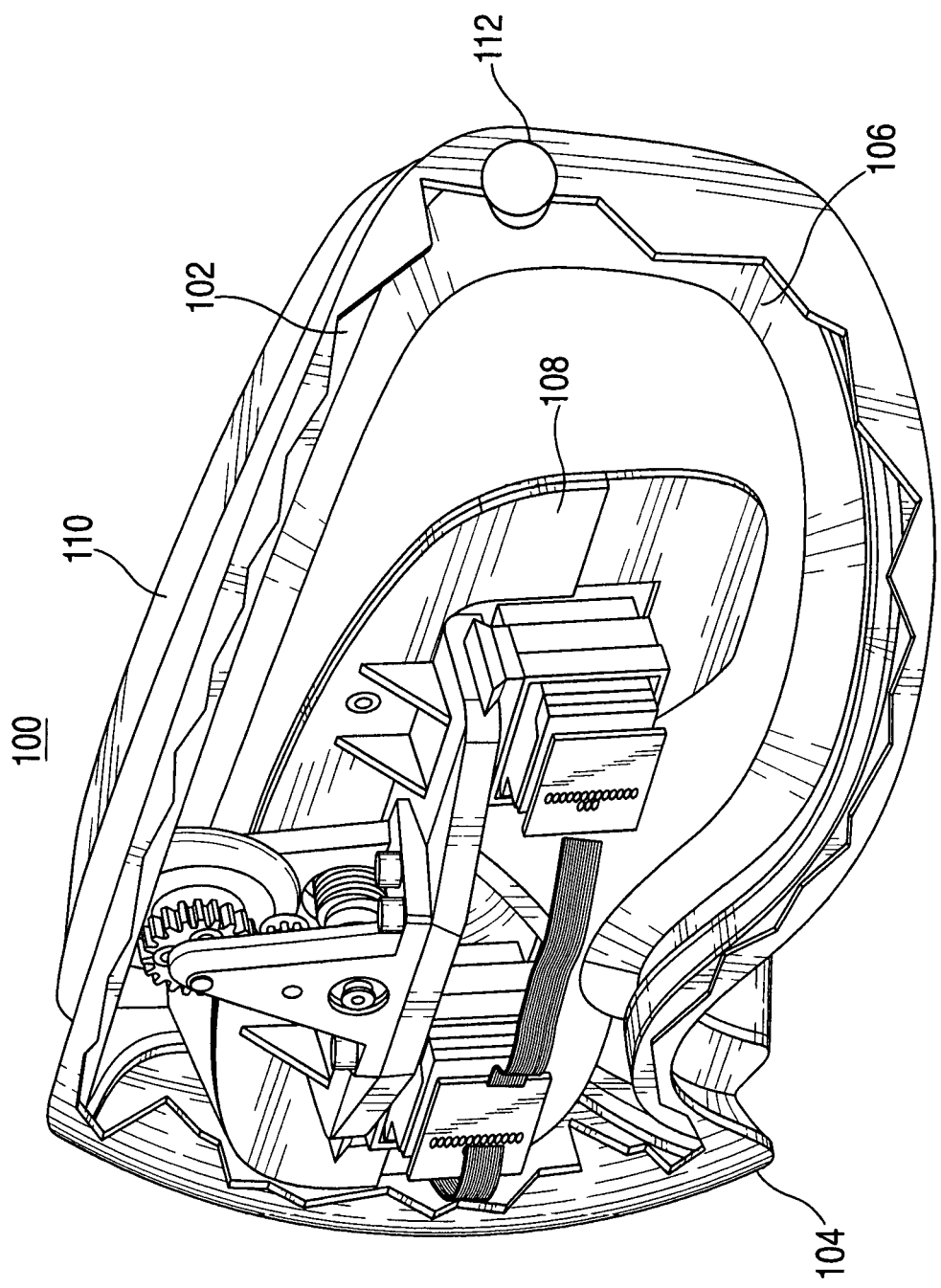
FIG. 1 shows a perspective view of a personal display device in accordance with one embodiment of the present invention.

FIG. 1 shows a perspective view of a personal display device in accordance with one embodiment of the present invention. Personal display device 100 may include mid-frame 102, outer cover 104, inner cover 106, mounting frame 108, foam 110 and interface 112. Mid-frame 102 may form the outer support structure for personal display device 100. Mid-frame 102 may be formed from any suitable material that may support the components of personal display device 100. In some embodiments, mid-frame 102 may be formed from a material selected from materials capable of withstanding impacts or shocks to protect the components of personal display device 100. In some embodiments, mid-frame 102 may be formed from a material selected from lightweight materials for a user's comfort. Suitable materials may include, for example, composite materials, plastics, metals, and metal alloys (e.g., steel, stainless steel, aluminum, titanium, or magnesium-based alloys).

Outer cover 104 may be coupled to mid-frame 102 to form the outer surface of personal display device 100. Outer cover 104 may be formed from any suitable material including, for example, glass, plastic, ceramic, metal (e.g., polished aluminum), or any other suitable material. Outer cover 104 may be any suitable shape. In the example shown in FIG. 1, outer cover 104 is a curved surface that generally follows the contours of a user's face. In some embodiments, however, outer cover 104 may be a planar or substantially planar surface. In some embodiments, outer cover 104 may be formed from several pieces that are combined (e.g., and held in place by mid-frame 102).

Inner cover 106 may form the support structure for the display generation components of personal display device 100. Inner cover 106 may be formed from any suitable material. Such materials may include, for example, plastic, composite materials, metal or metallic alloys (e.g., aluminum), combinations thereof, or any other suitable material. In some embodiments, a material that is simultaneously lightweight and strong enough to support mounting frame 108 and display generation components may be selected. In some embodiments, the material selected for inner cover 106 may be such that inner cover 106 may be flexed to more closely approximate the contours of a user's face. In some embodiments, the material selected may be a plastic.

Mounting frame 108 may be coupled to inner cover 106 and may include or have mounted an adjusting mechanism and an optical module for providing media for the user. Mounting frame 108 may be a rigid frame for supporting the display generation components of personal display device 100. Mounting frame 108 may be formed from any suitable material. For example, mounting frame 108 may be formed from plastic, a composite material, a metal or metallic alloy (e.g., aluminum), or any other suitable material, or combinations thereof. In some embodiments, mounting frame 108 may be configured to remain substantially immobile relative to a user's eyes when inner cover 106 and foam 110 are moved (e.g., to more closely fit the contours of a user's face).

Mounting frame 108 may be coupled to inner cover 106 using any suitable approach. For example, mounting frame 108 may be coupled to inner cover 106 using an adhesive, tape, a fastener (e.g., a screw or a bold and nut), an interlocking mechanism (e.g., a snap-fit), or any other suitable approach.

Foam 110 may be attached to inner cover 106 to provide a comfortable fit for the user. Foam 110 may be formed by first creating a skin, for example by vacuum forming. The skin may be any suitable material that may be used in vacuum forming. Once the skin has been created, foam or another spongy material may be applied to the skin to form foam 110. The amount of foam applied to the vacuum formed skin may be varied to vary the thickness of foam 110. In some embodiments, different types of foam may be applied to vary the density of foam 110.

User interface 112 may be attached to outer cover 104 to allow the user to control adjustments of the displayed media. For example, the user may press a button to toggle between enabling and disabling movement of the media display based on user movements. As another example, the user may press a button of user interface 112 to change the user's perspective of the displayed media (e.g., change the virtual position of the user in a theater).

Figure 2:
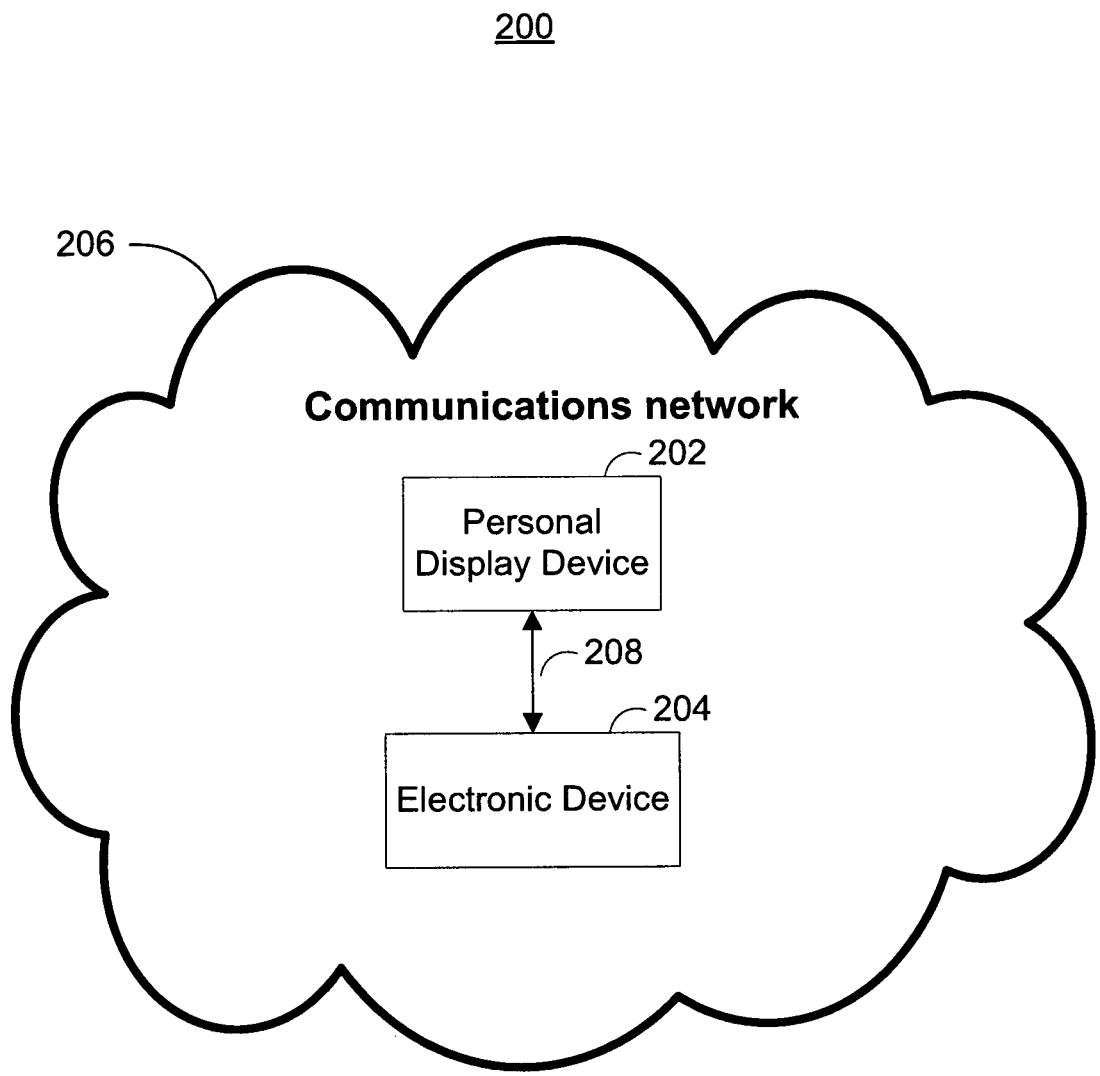
FIG. 2 shows a schematic view of a personal display system in accordance with one embodiment of the invention.

FIG. 2 shows a schematic view of a personal display system in accordance with one embodiment of the invention. Personal display system 200 may include personal display device 202, electronic device 204, and communications network 206. Personal display device 202 may use communications network 206 to perform wireless and/or wired communications with one or more electronic devices within communications network 206. Although personal display system 200 may include several of personal display devices 202 and electronic devices 204, only one of each is shown in FIG. 2 to avoid overcomplicating the drawing. For example, personal display system 200 may include several personal display devices 202 coupled to one electronic device 204. As another example, personal display system 200 may include one personal display device 202 coupled to several electronic devices 204 in communication with each other (e.g., for multi-person video games).

Personal display device 202 may be implemented in or as any type of display system such as, for example, a head mounted display, a television, a projection screen, an on-screen display of an electronic device, personal viewers and viewfinders found on camcorders and digital cameras, or any other suitable display system. In some embodiments, the personal display device may simulate the experience of watching a movie in a movie theater. In some embodiments, several personal display devices may simulate the experience of playing in a multi-player video game. For example, users may be different passengers in a racecar or drivers of different cars. Each user's personal display device may adjust the displayed media based on where the user is located in the game (e.g., the user sitting in the back seat behind the driver will see the back of the driver's head, or the user may see a different view of the outside world and of the other users' cars based on where the user's car is located on the road). In some embodiments, the personal display device may simulate the experience of playing in a first-person shooting game, in which the personal display device may display the game environment from the perspective of the user.

Electronic device 204 may include any suitable electronic device for sending media to personal display device 202. For example, electronic device 204 may include a media player such as an iPod available by Apple Inc., of Cupertino, Calif., a cellular telephone, a personal e-mail or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a mobile communications device, a television system, a desktop computer, a laptop computer, a gaming console, a cellular telephone, and any other device capable of communicating with personal display device 202.

Personal display device 202 and electronic device 204 may communicate using either a wireless communications network or a wired link. In some embodiments, a wireless communications network such as communications network 206 may be used. Personal display device 202 may be coupled with electronic device 204 in communications network 206 using any suitable approach. For example, personal display device 202 and electronic device 204, when located within communications network 206, may wirelessly communicate over a local wireless communication path such as communications link 208.

Any suitable circuitry, device, system or combination of these operative to create a communications network may be used to create wireless communication over communications link 208. For example, communications network 206 may be capable of providing wireless communications using any suitable short-range communications protocol. In some embodiments, communications network 206 may support, for example, Wi-Fi (e.g., a 802.11 protocol), Bluetooth (registered trademark), high frequency systems (e.g., 900 MHz, 2.4 GHz, and 5.6 GHz communication systems), infrared, other relatively localized wireless communication protocol, or any combination thereof.

As another example, communications link 208 may be a wired link that is coupled to both personal display device 202 and electronic device 204. As still another example, communications link 208 may include a combination of wired and wireless links (e.g., an accessory device for wirelessly communicating with personal display device 202 is coupled by a wire to electronic device 204). Any suitable connector, dongle or docking station may be used to couple personal display device 202 and electronic device 204. A more detailed discussion of a dongle or docking station that may be plugged into electronic device 204 may be found, for example, in Fadell et al., U.S. Patent Application Publication No. 2004-0224638, filed Apr. 25, 2003, entitled "Media Player System," which is incorporated by reference in its entirety herein.

Figure 3:
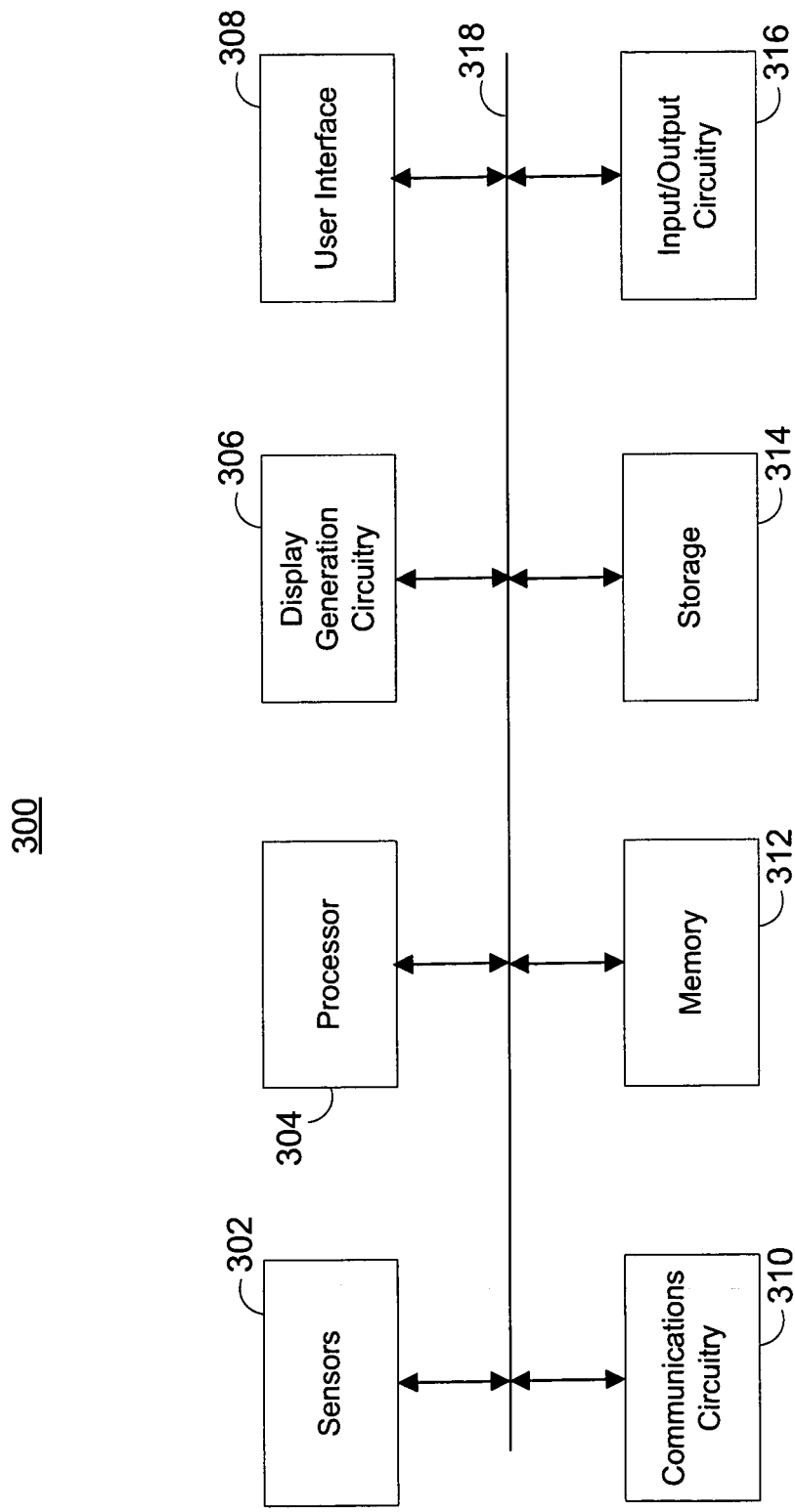
FIG. 3 shows a simplified block diagram of an illustrative personal display device in accordance with one embodiment of the invention.

FIG. 3 shows a simplified block diagram of an illustrative personal display device in accordance with one embodiment of the invention. Personal display device 300 may include sensors 302, processor 304, display generation circuitry 306, user interface 308, communications circuitry 310, memory 312, storage 314, input/output circuitry 316, and bus 318. In some embodiments, personal display device 300 may include more than one of each component or circuitry, but for the sake of illustration, only of each is shown in FIG. 3. In addition, one skilled in the art may appreciate that the functionality of certain components and circuitry may be combined or omitted and that additional components and circuitry, which are not shown in FIG. 3, may be included in personal display device 300.

Sensors 302 may include any sensors operative to measure a user's movement. In some embodiments, sensors 302 may include sensors to detect the user's head movements. Sensors 302 may include, for example, at least one of an accelerometer, a position sensor, a gyroscope, a distance sensor, a biological sensor, a geodetic sensor, an optical sensor, a video sensor, a RF sensor, or any other suitable sensor for detecting the user's head movements. For example, accelerometers may be installed in personal display device 300 to detect and measure the user's head movements.

In some embodiments, sensors 302 may include sensors operative to detect the user's eye movements. Sensors 302 may include, for example, at least one of an infrared sensor, an optical sensor, a light sensor, an image sensor, a photocell sensor, a biological sensor, an artificial sensor, or any other suitable sensor for detecting the user's eye movements. In addition, one skilled in the art will appreciate that other sensors capable of detecting movement or serving alternative functions (e.g., proximity sensors for detecting the presence of nearby objects) may also be used in personal display device 300.

Processor 304 may include any digital module operative to receive and process sensor inputs from sensors 302, media from an electronic device, and user inputs from user interface 308. In addition, processor 304 may provide media to display generation circuitry 306. In some embodiments, processor 304 may allow personal display device 300 to adjust the media display. For example, processor 304 may be configured to digitally increase or decrease the resolution of the media display, distort the media display, or crop the media display. As another example, processor 304 may be configured to extract right and left media images from the media provided for display in personal display device 300. In some embodiments, processor 304 may configure the right and left media images to create various effects. For example, processor 304 may configure the right and left media images to display media in full screen or in wide screen. In addition, the right and left media images may be treated or offset such that the media is displayed to the user in three dimensions (3D).

Display generation circuitry 306 may include any optical module operative to receive media (e.g., an image or a video signal) from processor 304 and display the media to the user. For example, display generation circuitry 306 may include one or more displays on which media may be displayed to the user. Display generation circuitry 306 may be operative to display media using any suitable configuration. For example, display generation circuitry 306 may display media in standard definition, high definition, with a standard aspect ratio, with a wide aspect ratio, or any other suitable configuration. In some embodiments, display generation circuitry 306 may allow personal display device 300 to optically or digitally adjust the media display without affecting the media's resolution. Display generation circuitry 306 may be configured to resize or otherwise-modify the media display such that the media appears to be larger and displayed at a greater distance, or smaller and displayed at a lesser distance, than the actual distance between personal display device 300 and the user's eyes (e.g., display generation circuitry 306 may modify the displayed media such that the viewer appears to be viewing the media from 4 meters away, and not 20 millimeters).

In some embodiments, personal display device 300 may include several display generation circuitries 306. For example, processor 304 may provide a right media image to a first display generation circuitry, and a left media image to a second display generation circuitry. Processor 304 may receive right and left media images from the media source (e.g., an electronic device coupled to personal display device 300), or may instead or in addition extract (e.g., optically or digitally) right and left media images from received media. The first and second display generation circuitries may be operative to adjust (e.g., optically or digitally) the media display for the user. One skilled in the art will appreciate that personal display device 300 may use any combination of processor 304 and display generation circuitry 306 to adjust the media display.

User interface 308 may receive user inputs and provide the user inputs to processor 304. In some embodiments, user interface 308 may allow a user to control the selection of media, the playback of media displayed in personal display device 300 (e.g., fast forward, rewind, pause, next, or slow-motion), the volume of the media, playlist controls, luminosity of the display, or any other operation of personal display device 300. In some embodiments, user interface 308 may instead or in addition be operative to control operations of an electronic device coupled to personal display device 300. User interface 308 may include any suitable user interface including, for example, a button, keypad, dial, click wheel, touch screen, or multi-touch screen.

Communications circuitry 310 may include any circuitry for receiving data from a remote source, such as the electronic device, over a wired or wireless link. Communications circuitry 310 may support any number of wireless communications protocols, such as Wi-Fi communications (e.g., one of the 802.11 standards), Bluetooth, Nordic, high frequency systems (e.g., 900 MHz, 2.4 GHz, and 5.6 GHz communication systems), short-range radio circuitry (e.g., walkie-talkie type circuitry), infrared, combinations thereof, or any other suitable communications protocol.

Memory 312 may store or cache media for display in personal display device 300. Memory 312 may include one or more different types of memory which may be used for performing system functions. For example, memory 312 may include cache, Flash, ROM, RAM, or one or more different types of memory used for temporarily storing data. Memory may be specifically dedicated to storing firmware. For example, memory 312 may be provided for storing firmware for system applications (e.g., operating system, user interface functions, and processor functions).

Storage 314 may locally store media on personal display device 300. Storage 314 may be, for example, one or more storage mediums, including for example, a hard-drive, flash memory, permanent memory such as ROM, any other suitable type of storage component, or any combination thereof. Storage 314 may store, for example, media data (e.g., music and video files), application data (e.g., for implementing functions on personal display device 300), firmware, preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable personal display device 300 to establish a wireless connection), subscription information data (e.g., information that keeps track of podcasts or television shows or other media a user subscribes to), contact information data (e.g., telephone numbers and email addresses), calendar information data, any other suitable data, or any combination thereof.

Input/output circuitry 316 may be operative to receive, convert (and encode/decode, if necessary), and output data, analog signals and other signals (e.g., physical contact inputs, physical movements from sensors 302, analog audio signals, etc.) to and from digital data. In some embodiments, conversion may be necessary for transferring video or audio signals between an electronic device and personal display device 300. The data may be provided to and received from processor 304, memory 312, storage 314, or any other component of personal display device 300. Although input/output circuitry 316 is illustrated in FIG. 3 as a single component of personal display device 300, a plurality of input/output circuitries 316 may be included in personal display device 300. Input/output circuitry 316 may be used to interface with any input or output component, such as those discussed in connection with FIG. 2. For example, personal display device 300 may include specialized input circuitry associated with input devices such as, for example, one or more microphones, cameras, proximity sensors, accelerometers, infrared sensors, or any other suitable specialized input circuitry. In some embodiments, personal display device 300 may include specialized output circuitry associated with output devices such as, for example, one or more speakers, circuitry for plugs for audio jacks, or any other suitable specialized output circuitries.

Bus 318 may provide a data transfer path for transferring data to, from, or between sensors 302, processor 304, display generation circuitry 306, user interface 308, communications circuitry 310, memory 312, storage 314, and input/output circuitry 316.

In some embodiments, personal display device 300 may include some or all of the components, functionality, or both of the electronic device. For example, personal display device 300 may include any electronic device hardware, such as a processor, memory for storing media (e.g., a hard-drive, flash memory, permanent memory such as ROM, semi-permanent memory such as RAM, or cache), or any other suitable hardware component. In some embodiments, personal display device 300 may be operative to perform the operations or functions of any suitable type of software or firmware, such as for example operating system functions, user interface functions, processor functions, video CODEC, audio CODEC, or any other suitable software or firmware operation.

Figure 4:
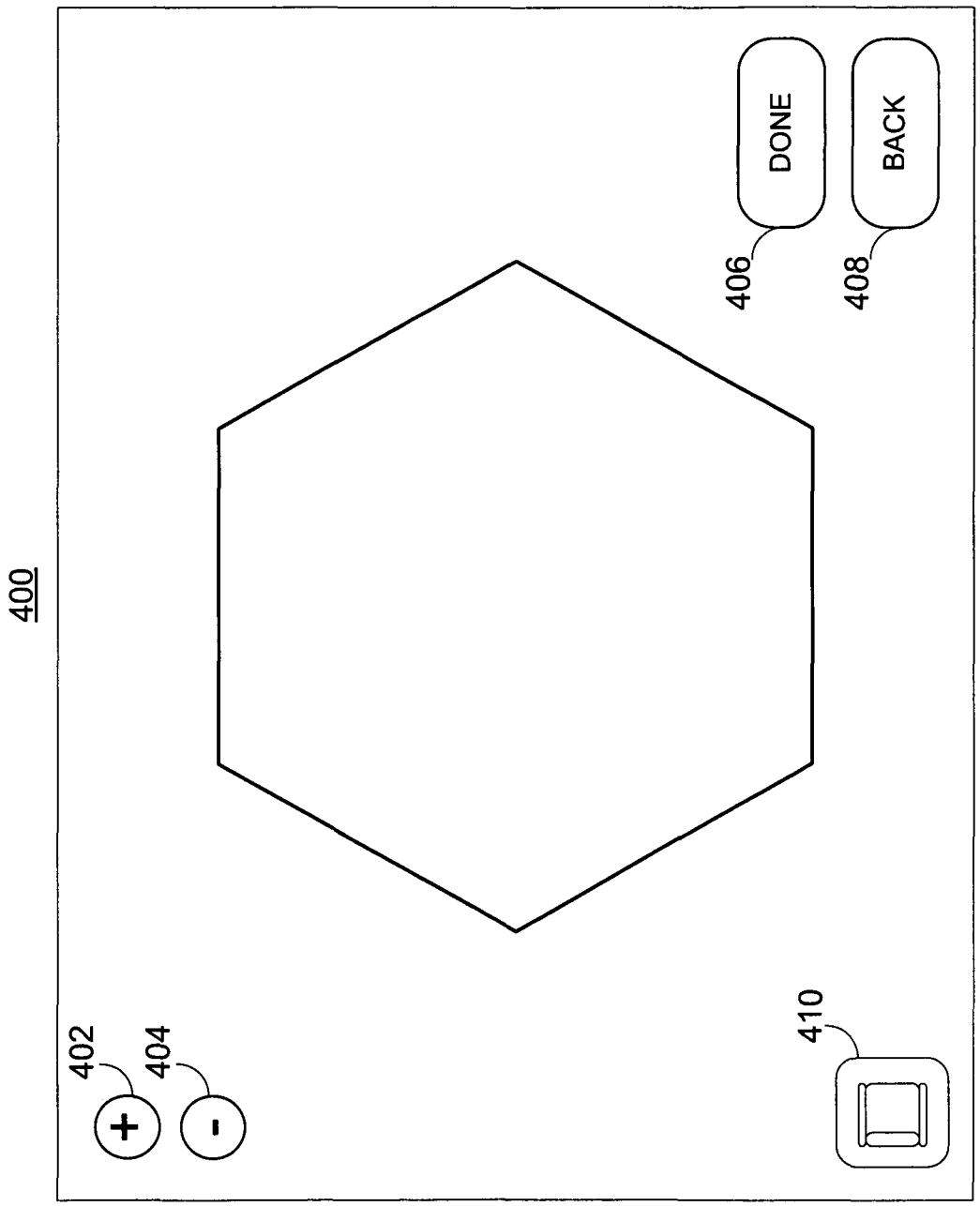
FIG. 4 shows a schematic view of an illustrative display screen for selecting a new viewing position in accordance with one embodiment of the invention.

FIG. 4 shows a schematic view of an illustrative display screen for selecting a new configuration or viewing position in accordance with one embodiment of the invention. As discussed previously, in some embodiments, display screen 400 can be configured to display 3D media. Display screen 400 may include zoom-in option 402, zoom-out option 404, done option 406, back option 408, and seat option 410 displayed, for example, as overlays over the media display. Display screen 400 may be displayed when the user selects a new viewing position option using a user interface, such as user interface 308 (FIG. 3). The user interface may be incorporated into the personal display device, such as personal display device 300 (FIG. 3), the electronic device, such as electronic device 204 (FIG. 2), or any combination thereof.

The user may select zoom-in option 402 to zoom in the displayed media. In some embodiments, the personal display device may use an optical component, such as an optical component incorporated in display generation circuitry, to adjust the displayed media so that the screen appears closer to the user. For example, display generation circuitry 306 (FIG. 3) may provide an optical component for adjusting the media display without modifying the resolution of the media. In some embodiments, the personal display device may make digital adjustments to the displayed media, including for example digitally zooming in the displayed media. For example, a processor of the personal display device, such as processor 304 (FIG. 3), may be operative to crop the displayed media and interpolate the cropped media display to the original dimensions of the media display.

The user may select zoom-out option 404 to zoom out the displayed media. Similar to zoom-in option 402, the personal display device may use one or both of optical and digital components to adjust the displayed media. For example, display generation circuitry 306 may provide an optical component for adjusting the media display without modifying the resolution of the media. As another example, a processor of the personal display device, such as processor 304, may be operative to decrease the resolution of the displayed media to give the user the impression that the media is further away. In some embodiments, the personal display device may provide limits to the amount a user can zoom a display in or out, for example to prevent the display from displaying a portion of the media that is too small or too large to be viewed.

In some embodiments, if the user zooms out to the point where the media no longer fills the entire media display region (e.g., the screen of the personal display device on which the media is displayed), the personal display device may superimpose an overlay over a region adjacent the periphery of the media. The overlay may include a black border, a movie theater wall, an outline of other viewers seated in the vicinity of the selected seat, a textual overlay, or any other suitable overlay.

As another example, the media provided to the personal display device may include several media items embedded in the same media. For example, using a split-screen approach (e.g., four media items, each taking up one quarter of the total screen size, where the periphery dimensions of each media item are the same), the electronic device may simultaneously provide video for several programs or movies (e.g., as a mosaic of several simultaneously displayed media items). Upon receiving a user selection of one of the programs or videos of the received media, the personal display device may zoom (e.g., automatically or in response to a user instruction) the display of the media to the portion of the media associated with the selected program or video, mask (e.g., and provide an overlay over) the portions of the media that do not include the selected program or video, zoom the display to view only the selected program or video, or combinations of these. The personal display device may superimpose an overlay over the mask. The overlay may be a transparent overlay, a black border, a movie theater wall, an outline of other viewers seated in the vicinity of the selected seat, or any other suitable textual overlays.

In some embodiments, the personal display device may selectively zoom out and crop displayed media, or zoom out and mask a portion of the displayed media to add an overlay on displayed media. The personal display processor may be operative to partially zoom out of the media display and crop the borders of the media display, which may reduce the screen size and give an impression to the user that the screen is farther away that it actually is. Any type of suitable overlays may be added on top of the cropped region.

Once the user has finished adjusting the media display, the user may select done option 406 to save any adjustments that have been made. In response to the user selecting done option 406, the media display may remove the displayed options and display the media using the new configuration. If the user selects not to save any adjustments that have been made, the user may select back option 408. In response to a user selection of back option 408, the personal display device may remove the overlay continue to display the media in the original configuration. In some embodiments, the user may choose not to select a new viewing position by not selecting any of zoom-in option 402, zoom-out option 404, or seat option 410 for a period of time. The personal display device may then remove the overlay after the period of time has elapsed.

Figure 5:
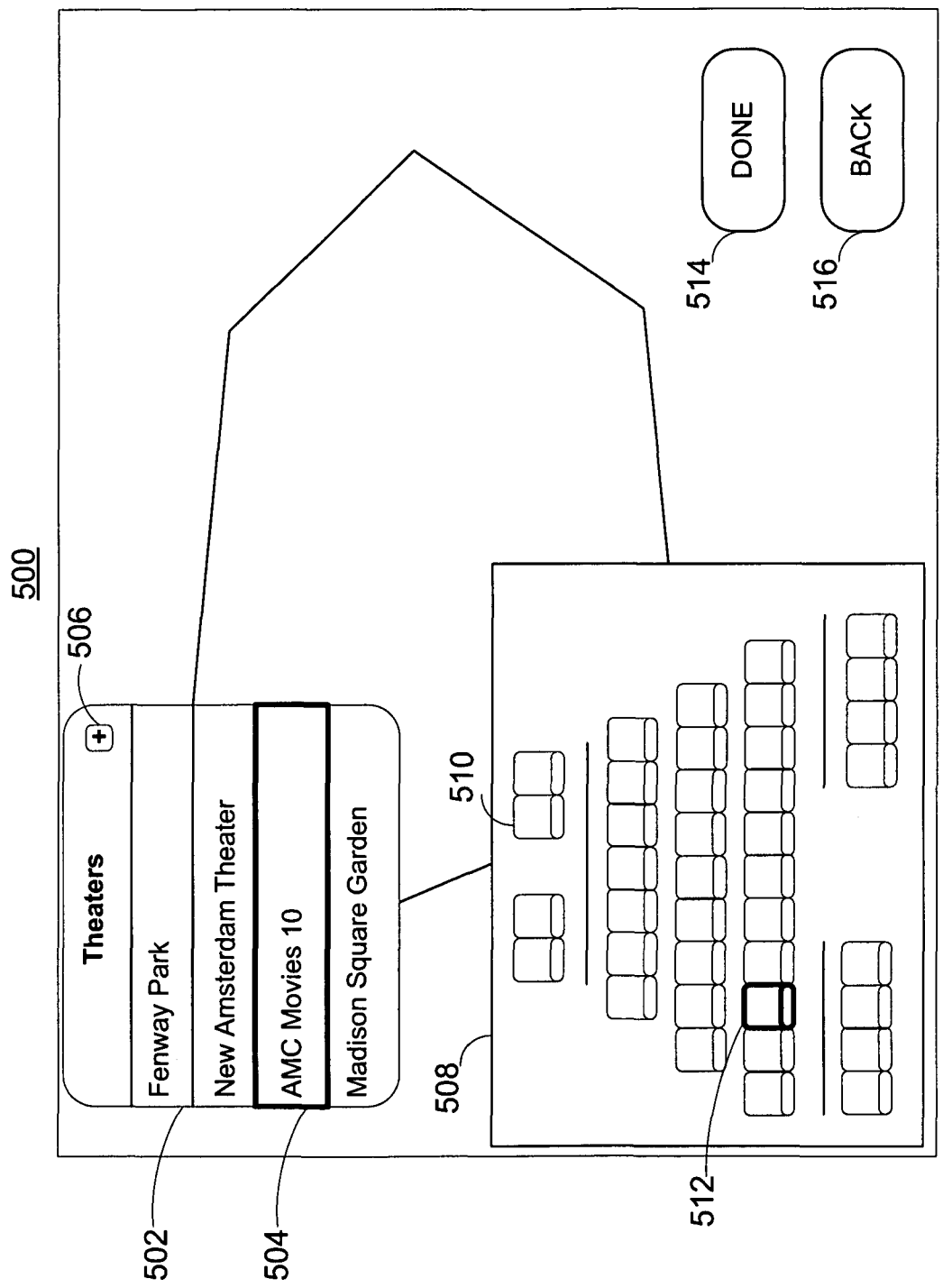
FIG. 5 shows a schematic view of an illustrative display screen for selecting seats in a theater in accordance with one embodiment of the invention.

In response to the user selecting seat option 410, the personal display device may provide the user with an option for selecting a particular seat or location in a theater. In response to receiving a user selection of a particular seat or location, the personal display device may modify the displayed media to reflect the seating position selected by the user. The personal display device may display any suitable option or series of options for selecting a particular seat or location in response to a user selection of seat option 410. For example, the personal display device may display an image of a seating map in which some or all of the seats may be selected. FIG. 5 shows a schematic view of an illustrative display screen for selecting seats in a theater in accordance with one embodiment of the invention. In some embodiments, the personal display device may provide the user with an opportunity to view media as if the user were in a known theater, park or hall. For example, the personal display device may provide the user with an opportunity to view media associated with a baseball game as if the user were in a baseball stadium (e.g., Fenway Park or Yankee Stadium). Display screen 500 may include listings 502 of selectable theaters for which representative information is stored on the personal display device. As used herein, the term theater will be understood to include any suitable movie theaters, performing art theaters, auditoriums, lecture halls, sports stadiums, or any other suitable environment for attending a performance. The user may select a listing 502 by placing highlight region 504 over the listing.

The user may add a new theater to listings 502 by selecting add option 506. In response to receiving a user selection of add option 506, the personal display device may allow the user to enter information for the new theater. In some embodiments, the personal display device may provide an interface for the user to create a customized theater. In some embodiments, the personal display device may access a database that the user may search to identify a particular theater. In response to receiving a selection of a particular theater, the personal display device may download a seating map and other information for the selected particular theater and store the information on the personal display device, the electronic device, or both.

Once the user has selected a particular theater from listings 502, the personal display device may display a representation of the available seats in seating map 508. The personal display device may identify the user's current viewing position using current seat highlight 510. One or more seats or sections of seating map 508 may be selectable, such that in response to a selection of a particular seat, the displayed media may be adjusted to reflect the selected seat. In response to receiving a selection of a seat or section using highlight region 512, the personal display device may adjust the displayed media to provide a preview of the newly selected viewing position to the user. For example, the media display may be adjusted to simulate a viewing experience from any seat in a movie theater (e.g., a back left side seat, a middle-center seat, or a front-center seat). In addition, the personal display device may overlay or display elements of the selected theater on the display. For example, the personal display device may display the outline of another user's head in a movie theater, or particular architecture of the selected theater. In some embodiments, the overlaid elements of the theater may be operative to move to further enhance the user's viewing experience (e.g., see a fan stand up and move at a sports stadium, or watch a curtain open and close at the beginning and end of the media).

The personal display device may not be limited to changing the configuration of the media on a display. The personal display device may instead or in addition be operative to adjust any other parameter or configuration related to the media or to the user's experience. In some embodiments, the personal display device may adjust the audio output along with adjustments of the media display. For example, the personal display device may provide audio effects specific to the theater or stadium selected by the user (e.g., acoustic effects and resonance of Carnegie Hall, or crowd noises for Veterans Stadium).

In some embodiments, surround sound (e.g., Dolby Digital, DVD-Audio, SuperAudio CD, MP3 Sound, and theatrical film 5.1 surround sound formats, etc.) integrated in the personal display device may be adjusted based on the user's selected viewing position or any other configuration. As a result, a user sitting in the front-center of the movie theater may hear sounds differently than a user sitting in the back left side or middle-center of the theater. As another example, audio may be louder if a user zooms in to the displayed media, and softer if the user zooms out of the displayed media. Persons skilled in the art will appreciate that any suitable type of audio adjustments, such as, for example, 3D sound effects or room equalization, can be made when a user selects different viewing positions in a theater.

Once the user is satisfied with the new viewing position, the user may press done option 514. In response to the user selecting done option 514, the personal display device may remove the displayed options and display the media from the new viewing position. If the user does not wish to change viewing positions, the user may select back option 516 to return to display screen 400 (FIG. 4) or to remove the overlay and continue to display the media using the previous configuration or viewing position.

In response to a user request to display options for controlling the viewing position or configuration of the displayed media, the personal display device may pause, stop or continue playback of the media. In some embodiments, the personal display device may stop or pause playback of media in response to receiving a user instruction to change the configuration of the media, and may display a preview of the media with the changed configuration. For example, the personal display device may play back a few seconds of the media prior or after the playback position of the media when the instruction was received. In some embodiments, the personal display device may use the preview period to populate a buffer of the media to which the new configuration is applied. As another example, the personal display device may continue to play back the media, and change the configuration of the media in real time as the user selects different options. This approach may require more intensive processing power and memory than an approach in which the personal display device takes time for a buffer to populate.

Persons skilled in the art will appreciate that either personal display device 300 (FIG. 3) or electronic device 204 (FIG. 2) can provide processing power to adjust the displayed media. For example, personal display device 300 can use processor 304 to locally generate overlays and alter the display. Persons skilled in the art will also appreciate that the two devices can provide joint processing of the displayed media.

In some embodiments, depending on the content of the media that is displayed, personal display device 300 can dynamically adjust a user's viewing position to an optimal location. For example, if a user is watching a football game, personal display device 300 can adjust the user's viewing position based on the location of the plays. In some embodiments, information for different viewing positions can be embedded in the media, automatically determined by personal display device 300, or any combination thereof. For example, personal display device 300 can determine based on video (e.g., yard markers on the field) and/or audio processing (e.g., the sportscaster's voice) where a football play is being made. In response to determining the location, personal display device 300 can calculate the optimal viewing position and correspondingly adjust the viewing position for the user.

Figure 6A:
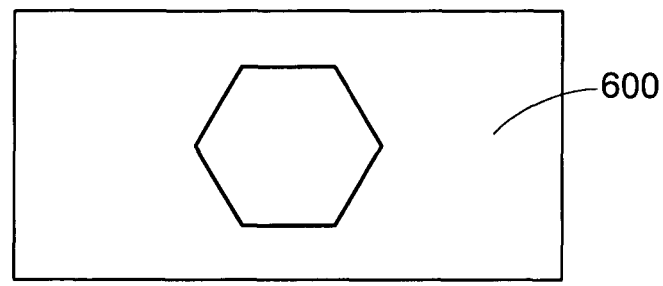
FIGS. 6A-6E show illustrative display screens for adjusting the media display in accordance with one embodiment of the invention.
Figure 6B:
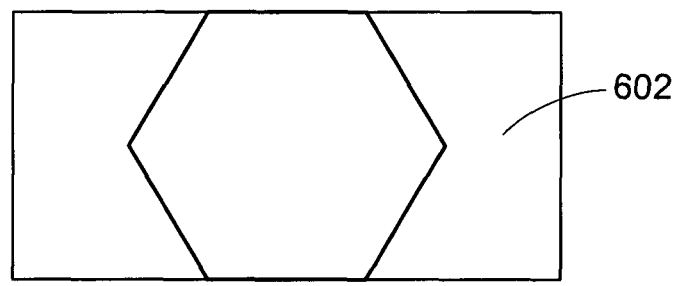

FIGS. 6A-6E show illustrative display screens of adjusted media displayed by a personal display device in accordance with one embodiment of the invention. FIG. 6A is an illustrative display of media. A personal display device, such as personal display device 300 (FIG. 3), may display the selected media in display 600. Display 600 may be an initial, unadjusted display of the selected media. FIG. 6B is an illustrative display of adjusted media. In some embodiments, the media displayed in display 602 may be the same as the media displayed in display 600. The personal display device may adjust the displayed media such that display 602 may include the media when it has been zoomed in. The user may zoom in the media display by selecting a zoom in option, such as zoom in option 402 (FIG. 4).

Figure 6C:
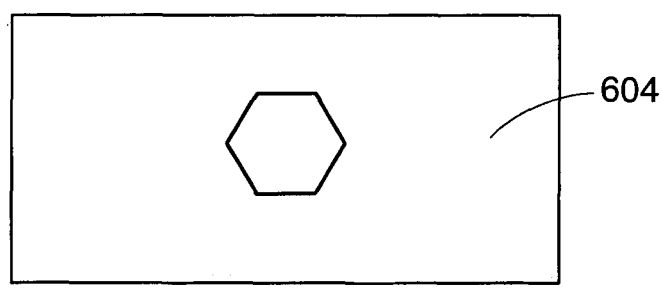

FIG. 6C is an illustrative display of adjusted media. In some embodiments, the media displayed in display 604 may be the same as the media displayed in display 600. The personal display device may adjust the displayed media such that display 604 may include the media when it has been zoomed out. The user may zoom out the media display by selecting a zoom out option, such as zoom out option 402 (FIG. 4).

Figure 6D:
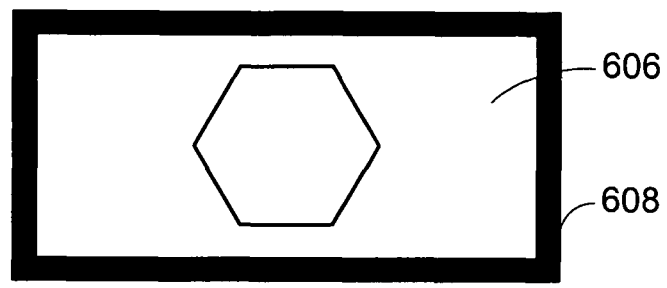

FIG. 6D is an illustrative display of adjusted media. In some embodiments, the media displayed in display 606 may be the same as the media displayed in display 600. The personal display device may adjust the displayed media such that display 606 may include the media when it has been zoomed out and masked or cropped (e.g., as shown by overlaying border 608). The user may zoom in the media display by selecting a zoom in option, such as zoom in option 402 (FIG. 4). The user may mask or crop the media using any suitable approach, include for example by adjusting the configuration of the displayed media to reflect a theater. For example, the user may select the type of border 608 overlaid by selecting a particular theater, or by selecting a generic border that is not specific to a particular theater or type of performance location (e.g., a black border representing a generic movie theater). In some embodiments, the personal display device may display an overlay, or mask or crop a portion of the displayed media independently of zooming the display of the media.

Figure 6E:
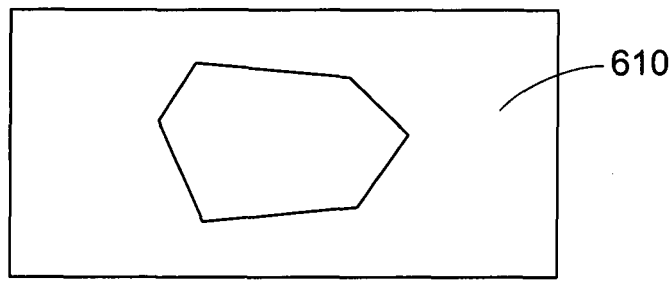

FIG. 6E is an illustrative display of adjusted media. In some embodiments, the media displayed in display 610 may be the same as the media displayed in display 600. The personal display device may adjust the displayed media such that display 610 may include the media that has been distorted to reflect the position of the user in a selected theater. For example, as shown in FIG. 6E, a display from the perspective of a seat in the left of a theater may appear curved as opposed to a display from the center the theater. The displayed media may be distorted using any suitable approach, including for example digitally or by using optical components. The user may select a particular theater, particular seat or location in the theater, or both using any suitable approach, including for example seat option 410 (FIG. 4).

In some embodiments, if several display generation circuitries are used to display media, each display generation circuitry may display a media image. The personal display device may combine all of the media images to produce the overall media display. In some embodiments, the personal display device may adjust the displayed media while ensuring that the media images produced by the display generation circuitries are aligned to maintain a coherent overall media display. For example, if the displayed media includes the sum of right and left media images generated by a processor, one or both of the processor and the display generation circuitries may align the right and left images to provide an optimal viewing experience.

Figure 7:
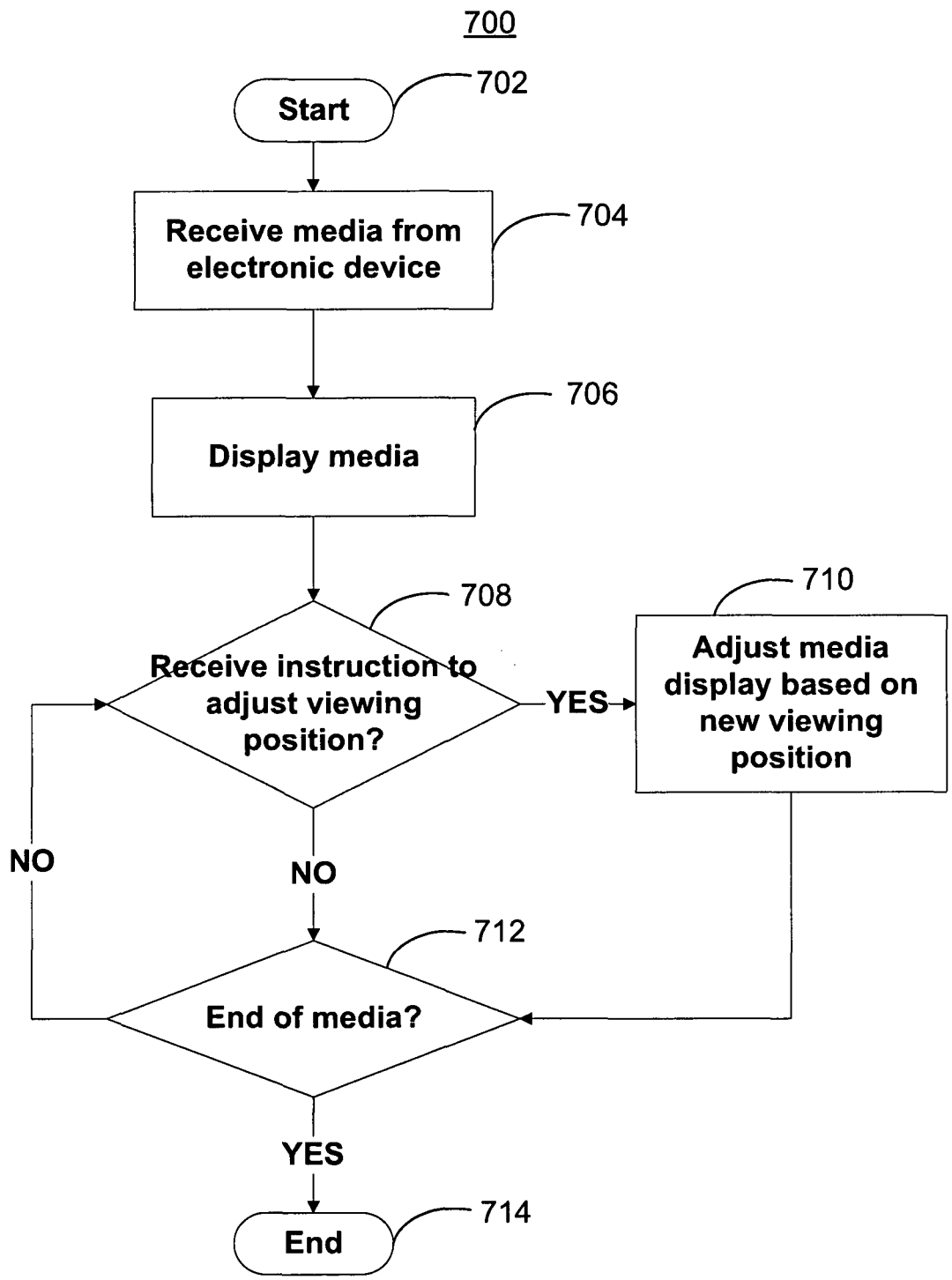
FIG. 7 shows a flowchart of an illustrative process for adjusting the media display in response to user inputs in accordance with one embodiment of the invention.

FIG. 7 shows a flowchart of an illustrative process for adjusting the media display in response to user inputs in accordance with one embodiment of the invention. Process 700 may start at step 702. At step 704, a personal display device, such as personal display device 300 (FIG. 3), may receive media from an electronic device, such as electronic device 204 (FIG. 2). At step 706, the personal display device may display the received media. For example, display generation circuitry, such as display generation circuitry 306 (FIG. 3), may display the media for the user. The personal display device may display the media using any suitable viewing position or configuration. The initial viewing position may be automatically generated by the personal display device or previously set by the user.

At step 708, the personal display device may determine whether an instruction to adjust the viewing position has been received. For example, a processor, such as processor 304 (FIG. 3), may determine whether the user provided an instruction to adjust the viewing position using a user interface, such as user interface 308 (FIG. 3). Suitable instructions may include, for example, a user selection of viewing position options, such as those displayed in display screen 400 (FIG. 4).

If, at step 708, the personal display device determines that a new viewing position has been selected, process 700 may move to step 710. At step 710, the personal display device may adjust the media display based on the new viewing position. For example, the personal display device may adjust the configuration of the displayed media to zoom the media in or out, or to adjust the orientation of the user relative to the display (e.g., in response to receiving a user selection of a seat in a theater for viewing the media). Once the personal display device has adjusted the displayed media, process 700 may proceed to step 712, where the personal display device may determine whether the end of the media has been reached.

If, at step 708, the personal display device instead determines that a new viewing position has not been selected, process 700 may move to step 712. At step 712, the personal display device may determine whether the end of the media has been reached. For example, the personal display device may compare the current playback position of the media with the length of the media. As another example, the processor may determine whether a stop instruction has been received from the user. If, at step 712, the personal display device determines that it has reached the end of the media, then process 700 may end at step 714. If the personal display device instead determines that it has not reached the end of the media, process 700 may return to step 708, where the personal display device may continue to determine whether an instruction to adjust the viewing position of the displayed media has been received.

As the user zooms in the displayed media, or applies a theater around the periphery of the media, portions of the media may not be displayed to the user at a given time. To allow the user to easily view portions of the media that are hidden from view at a given time, the personal display device may change the portions of the media that are shown in the personal display device display based on movements of the user. For example, as the user moves his head, the personal display device may adjust the portions of the media that are visible in the display to follow the movement of the user's head. Similarly, the personal display device may follow a user's eye movements to display different portions of the media. One skilled in the art may appreciate that movements of any other portion of the user's body may be used to adjust the portion of the media that is displayed. For simplicity, however, the following discussion will be provided in the context of head movements.

As the personal display device changes the portion of the media that is displayed, the user's eye captures and retains the displayed media after a slight delay with respect to the user's head movement. Accordingly, if the portion of the media displayed by the personal media device linearly follows the movements of the user's head without accounting for this delay, the user's eyes may be quickly fatigued, and the user's viewing experience may be reduced.

Figure 8:
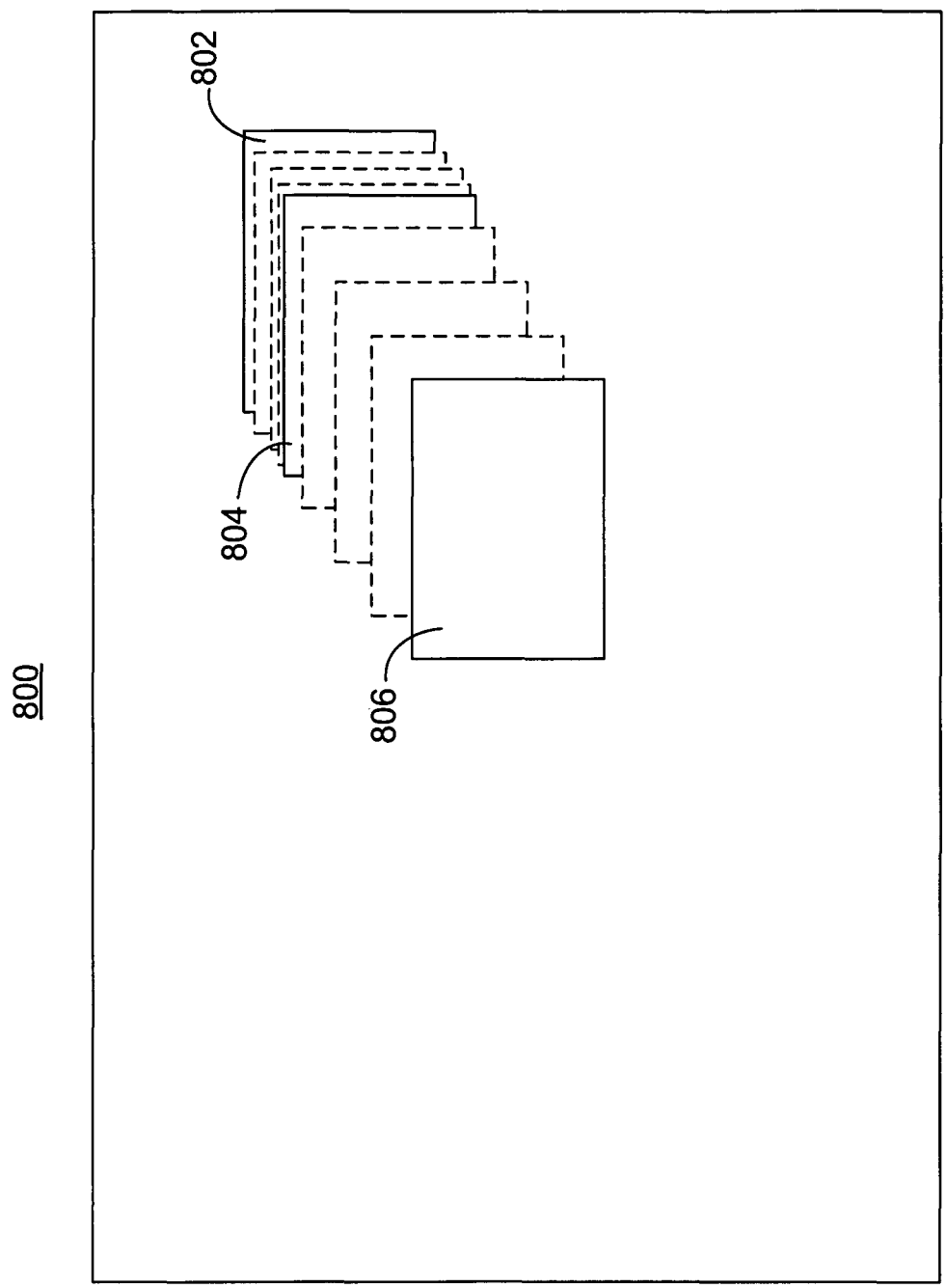
FIG. 8 shows a schematic view of successive personal display device displays displayed to reduce eye fatigue in accordance with one embodiment of the invention.

FIG. 8 shows a schematic view of successive personal display device displays displayed to reduce eye fatigue in accordance with one embodiment of the invention. The personal display device may determine which portion of media 800 to display in the personal display device display (the size of which is depicted by displays 802, 804 and 806) using any suitable approach. For example, when media begins, the personal display device may display the center portion of the media using a default zoom or a zoom selected by the user. As the user moves his head, sensors in the personal display device may be operative to detect and quantify the movement.

The personal display device may include any suitable sensor or combinations of sensors for detecting the user's head movement. For example, the personal display device may include one or more sensors 302 (FIG. 3). When a sensor detects movement, the sensor may be operative to provide an output to a processor (e.g., processor 304, FIG. 3), which may extract different information about the head movement from the sensor output. For example, the processor may determine the direction, speed, amount, and rate (e.g., acceleration) of the user's head movement. The processor may convert this information into any suitable structure for further processing (e.g., by the processor or by display generation circuitry), such as for example one or more vector quantities. For example, the direction of the vector may define the orientation of the movement, and the length of the vector may define the amount or rate of the movement.

Using the processed sensor output, the processor or display generation circuitry of the personal display device may adjust the portion of media displayed based on the output. For example, in a linear model, the personal display device may adjust the portion of media displayed in a manner directly proportional with the one or more vector quantities defining the head movement. As another example, the personal display device may adjust the portion of media displayed in a manner related to the amount by which the user's head was moved, but at a constant speed. As still another example, the personal display device may adjust the portion of media displayed by the same amount (e.g., relative to the overall size of the media), but at a speed related to the speed of the user's head movement.

In some embodiments, the personal display device may adjust the displayed media based on the amount of media that can be displayed at one time in the display. For example, if only a small portion of the media can be displayed at a given time in the display (e.g., the media is zoomed in), the personal display device may allow larger media adjustments for smaller head movements. Conversely, if a large portion of the media can be displayed at a given time in the display, the personal display device may allow smaller screen adjustments for larger head movements.

In some embodiments, the personal display device may provide a non-linear relation between the user's head movements and adjustments to the media display. For example, the personal media display may initially slowly move the portion of the media that is displayed, and subsequently accelerate the movement of the displayed media before stopping at the final position (e.g., an elastic effect). As another example, the personal display device may initially delay moving the displayed media in response to detecting movement of a user's head. As shown in FIG. 8, displays 802, 804 and 806 may depict successive portions of media 800 that the personal display device may display in response to detecting a head movement. In some embodiments, the time interval between displays 802 and 804, and 804 and 806 may be the same, while the distance between displays 802 and 804 may be smaller than the distance between displays 804 and 806 (i.e., there may be more overlap between displays 802 and 804 than 804 and 806). As the user moves his head, then, the portion of media 800 shown in the personal display device display slowly moves from the portion of the media depicted by display 802 to the portion depicted by display 804, and subsequently more rapidly moves from the portion of the media depicted by display 804 to the portion depicted by display 806.

When the media display has reached an edge or corner of the media, the display may stop responding to user head movements in the direction of the corner or edge. In some embodiments, the display device may display an overlay on a portion of media abutting the corner or edge to indicate to the user that the display has reached the edge of the media.

In some situations, the user may not want the media display to follow the user's head movements. For example, if the user is using personal display device while flying, and the aircraft flies through turbulent air, the user may not wish the personal display device to move the media as the user is shaken. As another example, the user may be tired or otherwise unable to keep his head steady, and may not wish the personal display device to adjust the media for smaller head movements. To prevent the personal display device from inadvertently adjusting the media display, the personal display device may be operative to ignore sensor outputs that do not exceed a minimum floor (e.g., representing a minimum head movement of interest to the personal display device). In some embodiments, the processor may use image stabilization techniques to ignore small head movements. Instead of, or in addition to disregarding smaller head movements, the personal display device may include an option for enabling or disabling the adjusting of media based on user head movements. For example, the personal display device may include a user interface operative to receive an input to enable the feature. The interface for enabling or disabling the adjusting of media may include any suitable mechanism for providing user inputs, including for example one or more buttons, switches, touchpads, or any other input mechanisms. For example, the personal display device may ignore head movements unless the user presses a button, or swipes the touchpad. As another example, the user may toggle the display adjustment feature by toggling a button (e.g., a button on interface 112, FIG. 1).

Figure 9:
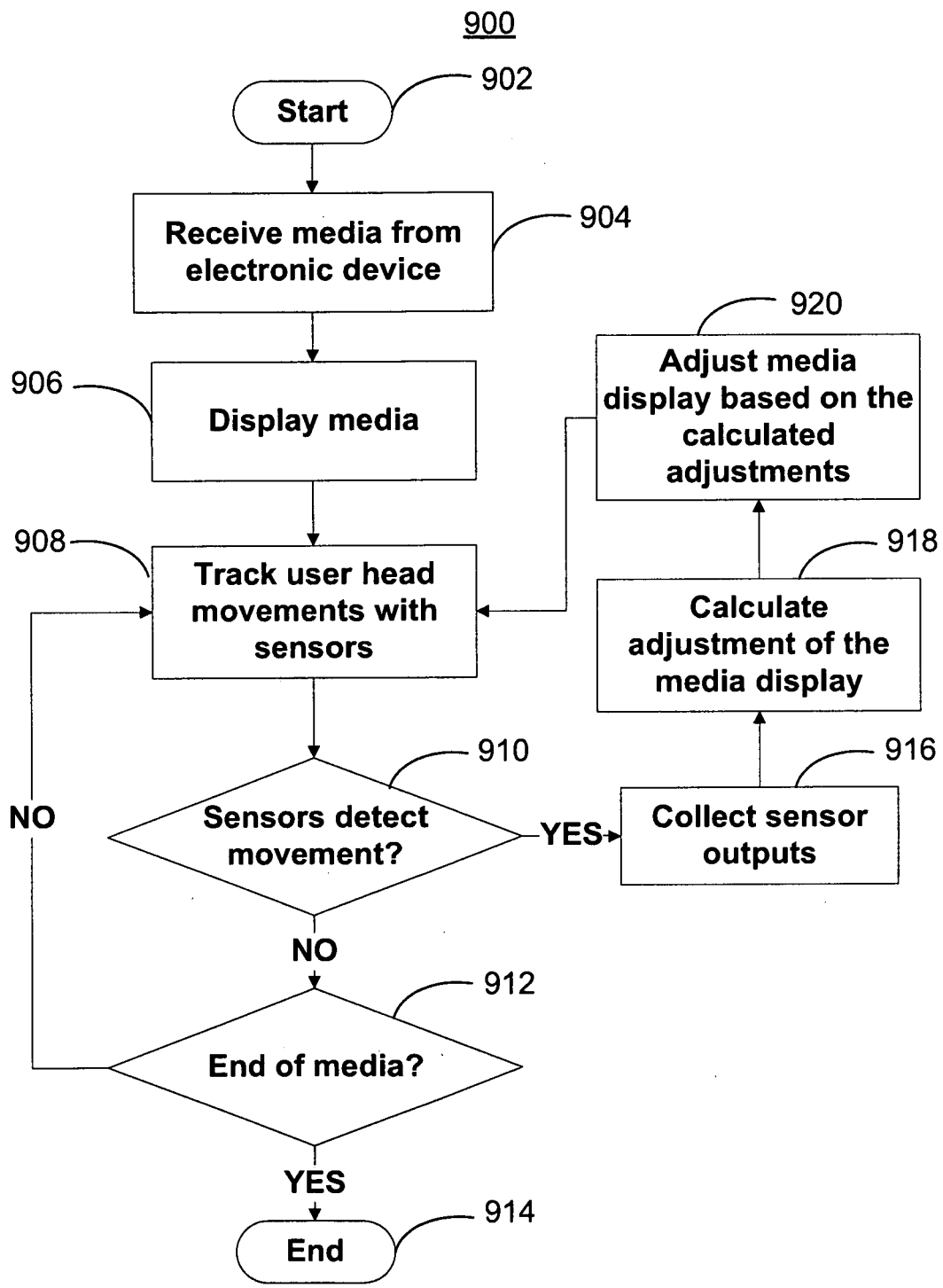
FIG. 9 shows a flowchart of an illustrative process for adjusting the media display of a personal display device in response to sensor outputs in accordance with one embodiment of the invention.

FIG. 9 shows a flowchart of an illustrative process for adjusting the media display of a personal display device in response to sensor outputs in accordance with one embodiment of the invention. Process 900 may start at step 902. At step 904, a personal display device, such as personal display device 300 (FIG. 3), may receive media from an electronic device, such as electronic device 204 (FIG. 2). At step 906, the personal display device may display the received media. For example, display generation circuitry, such as display generation circuitry 306 (FIG. 3), may be operative to display the media for the user. The amount of the media displayed may include any suitable portion of the media, including for example an amount that is less than the available media (e.g., the perimeter of the displayed amount is less than the perimeter of the received media). For example, the user may only see the portion of media 800 that is in display 802 (FIG. 8).

At step 908, the personal display device may track user head movements using sensors. For example, one or more sensors incorporated in the personal display device (e.g., sensors 302, FIG. 3) may track user head movements on one or more axes and may provide outputs representative of the user's head movements. A processor of the personal display device (e.g., processor 304, FIG. 3) may be operative to receive the sensor outputs and extract head movement information. At step 910, the personal display device may determine whether the sensors detected movement of the user's head. For example, the processor may determine whether the output received from the sensors exceeds a minimum floor. As another example, the processor may determine whether the output received directs the device to adjust the media display in a manner that cannot be adjusted (e.g., the media has already reached an edge or corner towards which the movement would have the media display move, or the available media and the display are the same size). If the personal display device determines that the sensors have not detected movement of the user's head, process 900 may move to step 912.

At step 912, the personal display device may determine whether the end of the media has been reached. For example, the processor may compare the currently playback position with the length of the media. As another example, the processor may determine whether a stop instruction has been received from the user. If the personal display device determines that the end of the media has been reached, process 900 may end at step 914. If, at step 912, the personal display device instead determines that the end of the media has not been reached, process 900 may return to step 908, and the personal display device may continue to track user head movements using the sensors.

If, at step 910, the personal display device instead determines that the sensors have detected movement of the user's head, process 900 may move to step 916. At step 916, the personal display device may collect the sensor outputs. For example, the processor may store the sensor outputs in memory, or may provide the sensor outputs to the display generation circuitry. At step 918, the personal display device may calculate the adjustment for the media display based on the sensor outputs. For example, the processor may convert the sensor outputs to one or more vectors. Using the sensor outputs, the processor may determine the manner (e.g., the amount and rate) in which the media display may be adjusted.

At step 920, the personal display device may adjust the media display based on the calculated adjustments of step 918. For example, the personal display device may successively change the portion of the media that is shown in the display. The adjustment may be related to the head movement and sensor output using any suitable approach, including for example a linear correlation and a non-linear correlation. In some embodiments, the personal display device may initially delay the adjustment of the media display in response to receiving the sensor output. Process 900 may then return to step 908, and the personal display device may continue to track user head movements using the sensors.

One skilled in the art will appreciate that the invention can be practiced by other than the described embodiments, which are presented for purposes of illustration and not of limitation, and the present invention is limited only by the claims which follow.

What is claimed is:

1. A method for adjusting media using a personal display device, comprising:
   displaying the media on a display of the personal display device;
   receiving a user instruction to change a position of the user in a virtual location for viewing the media;
   adjusting the media, such that the adjusted media is skewed to reflect the change in the position of the user in the virtual location; and
   displaying the adjusted media and peripheral content on the display, wherein the adjusted media has the same media content as the media displayed prior to the adjustment, and wherein the peripheral content is modified to present additional content representative of an actual location within a physical venue corresponding to the virtual location.

2. The method of claim 1, wherein receiving a user instruction to change a position of the user in the virtual location further comprises receiving a user selection of a particular perspective from which to display the media.

3. The method of claim 2, further comprising displaying at least two selectable options representing different user perspectives of the media.

4. The method of claim 3, wherein the at least two selectable options include at least two seats in a representation of a theater seating map.

5. The method of claim 1, further comprising:
   displaying a representation of a theater;
   displaying at least two selectable sections in a representation of a seating map of the theater;
   receiving a user selection of one of the at least two sections; and
   wherein receiving a user instruction to change the position of the user in the virtual location further comprises receiving a user instruction to change the user's perspective to the perspective from the selected section.

6. The method of claim 5, further comprising receiving a user selection of the theater for which to display a representation.

7. The method of claim 6, wherein a plurality of known theaters are stored on the personal display device and available for selection by the user.

8. The method of claim 7, further comprising:
   receiving a user instruction to select a theater that is not stored on the personal display device;
   receiving data defining the characteristics of the theater from a remote source; and
   wherein displaying a representation of a theater further comprises displaying a representation of the received theater.

9. The method of claim 5, further comprising:
   extracting theater data associated with the theater, wherein the theater data comprises the theater architecture; and
   displaying at least a portion of the extracted theater data as the peripheral content.

10. The method of claim 9, wherein the theater data further comprises at least one of data defining audio adjustments and graphical overlays for display over the adjusted media.

11. The method of claim 1, wherein the peripheral content is independent of the adjusted media.

12. A method for selecting a perspective from which to display media using a personal media device, comprising:
   receiving a user selection of the media;
   displaying the selected media from a first user perspective on a display of the device, wherein the actual distance between the display and the user's eyes is fixed, and wherein the first user perspective allows the user to view the selected media at a first virtual distance between the selected media and the user's eyes;
   displaying a plurality of selectable user perspective options on the display;
   receiving a selection of a user perspective option from the displayed plurality of selectable user perspective options, wherein the selected user perspective option changes the first user perspective to a second user perspective;
   adjusting the selected media to reflect the second user perspective, wherein the second user perspective allows the user to view the selected media at a different virtual distance between the selected media and the user's eyes and wherein adjusting the selected media includes modifying peripheral content to present content representative of an actual location within a physical venue corresponding to the second user perspective;
   displaying the adjusted media and the peripheral content on the display, such that the displayed media appears from the second user perspective, the adjusted media having the same media content as the selected media, and wherein the peripheral content is associated with the second user perspective.

13. The method of claim 12, wherein displaying a plurality of selectable user perspective options further comprises:
   receiving a user request to display a seating map; and
   displaying the seating map, wherein the seating map comprises options for selecting a section of the seating map.

14. The method of claim 13, further comprising:
   receiving a user selection of a particular theater; and
   displaying the seating map associated with the particular theater.

15. The method of claim 14, wherein receiving a user selection of a particular theater further comprises extracting theater data associated with the particular theater, wherein the theater data comprises at least one of the theater architecture, graphical overlays for displaying over the adjusted media, and data defining audio adjustments.

16. A personal display device for adjusting a user's perspective of media, the personal display device comprising a processor, a display screen, and a user interface, the processor operative to:
   receive the media for display on the display screen;
   direct the display screen to initially display the received media;
   receive a user selection from the user interface of a position in a virtual location from which to view the received media;
   adjust the received media to reflect the selected position in the virtual location;
   direct the display screen to display the adjusted media, wherein the adjusted displayed media appears to be viewed from the selected position in the virtual location, wherein the adjusted displayed media comprises the same media content as the initially displayed media and occupies a different amount of space on the display screen than the initially displayed media; and direct the display screen to display peripheral content with the adjusted media, wherein the peripheral content is modified to present additional content representative of an actual location within a physical venue corresponding to the virtual location.

17. The personal display device of claim 16, wherein the processor is operative to:

display a plurality of selectable options, wherein each option of the plurality of selectable options is associated with a particular one of a plurality of positions in the virtual location from which to view the media; and receive a selection from the user interface of one of the displayed plurality of selectable options.

18. The personal display device of claim 16, wherein the processor is operative to direct the display screen to display a seating map comprising a plurality of selectable options, wherein each option of the plurality of selectable options is associated with a particular one of at least one of a seat and a section of the displayed seating map.

19. The personal display device of claim 16, wherein the processor is operative to:

receive a user selection of a theater; and direct the display screen to overlay a representation of the selected theater as at least a portion of the peripheral content on the adjusted media.

20. The personal display device of claim 16, wherein the processor is operative to:

receive data defining the features of a theater;

receive a user selection of the theater; and extract the received data associated with the selected theater.

21. The personal display device of claim 16, wherein the processor is operative to receive media for display from an electronic device coupled to the personal display device.

22. The personal display device of claim 16, wherein the processor is operative to overlay the peripheral content over at least a portion of the adjusted media.

23. The personal display device of claim 16, wherein the processor is further operative to:

detect that the adjusted media only occupies a first portion of the display screen; and direct the display screen to display the peripheral content on a second portion of the display screen.

24. The personal display device of claim 16, wherein the processor is further operative to adjust audio associated with the received media to reflect the selected position in the virtual location from which to view the received media.

25. A personal display device for viewing a particular one of a mosaic of a plurality of simultaneously displayed media items, the personal display device comprising a processor, a display, and a user interface, the processor operative to:

receive media for display, wherein the media comprises the mosaic of the plurality of simultaneously displayed media items, and wherein each displayed media item of the plurality of simultaneously displayed media items is playing back a particular media content;

receive a user selection from the user interface of a particular one of the plurality of simultaneously displayed media items;

adjust the received media to mask the media items other than the particular one of the plurality of simultaneously displayed media items; and direct the display to display the adjusted media, wherein the adjusted media display comprises substantially only the particular one of the plurality of simultaneously displayed media items.

26. The personal display device of claim 25, wherein the processor is operative to zoom the display of the media such that the adjusted media display comprises only the particular one of the simultaneously displayed media items.

27. The personal display device of claim 25, wherein each of the plurality of simultaneously displayed media items of the media comprise substantially the same periphery length.

28. The personal display device of claim 25, wherein the processor is operative to display an overlay on top of the mask.

29. The personal display device of claim 28, wherein the overlay comprises at least one of a transparent overlay, a theater representation, a black border, and an outline of patrons.

* * * * *